United States Patent [19]

Lehmann et al.

[11] Patent Number: 5,112,958
[45] Date of Patent: May 12, 1992

[54] FIBRE-REACTIVE FORMAZAN DYES CONTAINING β-CHLOROETHYLSULFONYL OR VINYLSULFONYL BONDED VIA PHENYLAMINOTRIAZINYLAMINO

[75] Inventors: Urs Lehmann, Basel; Josef Koller, Reinach, both of Switzerland

[73] Assignee: Ciba-Geigy Corporation, Ardsley, N.Y.

[21] Appl. No.: 555,335

[22] Filed: Jul. 19, 1990

[30] Foreign Application Priority Data

Jul. 24, 1989 [CH] Switzerland .................. 2761/89

[51] Int. Cl.⁵ .................. C09B 62/503; D06P 1/384
[52] U.S. Cl. .................. 534/618; 534/573
[58] Field of Search .................. 534/618, 652

[56] References Cited

U.S. PATENT DOCUMENTS

| | | | |
|---|---|---|---|
| 3,926,942 | 12/1975 | Yelland | 534/618 |
| 4,843,148 | 6/1989 | Bonometti et al. | 534/618 X |
| 4,906,736 | 3/1990 | Schwaiger et al. | 534/618 |
| 4,935,500 | 6/1990 | Omura et al. | 534/618 |

FOREIGN PATENT DOCUMENTS

| | | | |
|---|---|---|---|
| 1161034 | 1/1984 | Canada | 534/618 |
| 0021351 | 1/1981 | European Pat. Off. | 534/618 |
| 0099721 | 2/1984 | European Pat. Off. | 534/618 |
| 0302115 | 2/1989 | European Pat. Off. | 534/618 |
| 56-100861 | 8/1981 | Japan . | |
| 57-92054 | 6/1982 | Japan | 534/618 |
| 63-81167 | 12/1988 | Japan . | |
| 1540565 | 2/1979 | United Kingdom | 534/618 |

OTHER PUBLICATIONS

Derwent Abstract of JP 56-100861n, (1980).

Chemical Abstract, vol. 97, No. 183939h (1982) Nippon.

*Primary Examiner*—Mary C. Lee
*Assistant Examiner*—Fiona T. Powers
*Attorney, Agent, or Firm*—Marla J. Mathias; Edward McC. Roberts

[57] ABSTRACT

The fibre-reactive formazan dyes of the formula

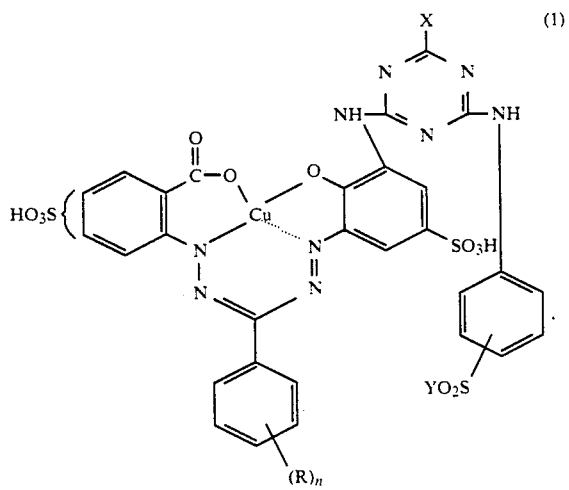

in which R is $C_1$–$C_4$alkyl, $C_1$–$C_4$alkoxy, halogen, cyano or nitro, X is fluorine or chlorine, Y is β-chloroethyl or vinyl and n is the number 0, 1 or 2 produce dyeings which have good fastness properties on nitrogen-containing or hydroxyl-containing fibre materials.

3 Claims, No Drawings

FIBRE-REACTIVE FORMAZAN DYES CONTAINING β-CHLOROETHYLSULFONYL OR VINYLSULFONYL BONDED VIA PHENYLAMINOTRIAZINYLAMINO

The present invention relates to novel fibre-reactive formazan dyes, processes for their preparation and the use of these dyes for dyeing and printing fibre materials.

The present invention relates to fibre-reactive formazan dyes of the formula (1)

in which R is $C_1$-$C_4$alkyl, $C_1$-$C_4$alkoxy, halogen, cyano or nitro, X is fluorine or chlorine, Y is β-chloroethyl or vinyl and n is the number 0, 1 or 2.

In the formula (1) and in the formulae below, the parentheses indicate that the respective group can be bound to one of the two positions of the benzene ring contained in the parentheses.

Examples of suitable $C_1$-$C_4$-alkyl as R in the formula (1) are methyl, ethyl, propyl, isopropyl, butyl, tert-butyl, sec-butyl or isobutyl, in particular methyl.

Examples of suitable $C_1$-$C_4$alkoxy as R in formula (1) are methoxy, ethoxy, propoxy, isopropoxy, butoxy, tert-butoxy, sec-butoxy or isobutoxy, in particular methoxy.

Examples of suitable halogens R in formula (1) are fluorine, bromine or preferably chlorine.

Dyes of the formula

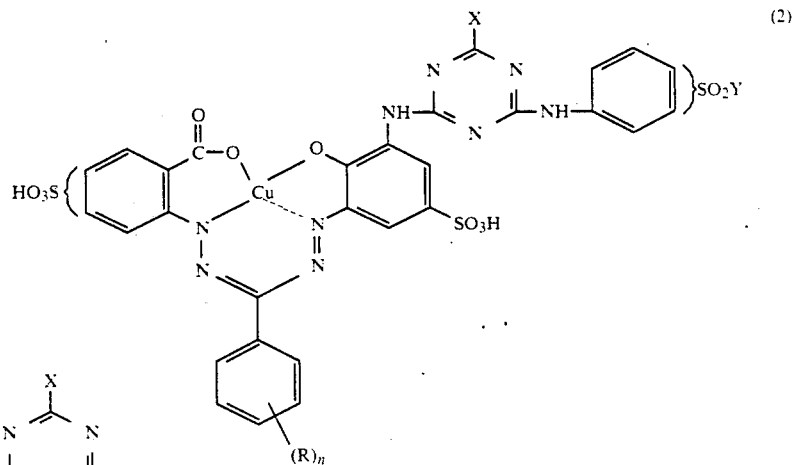

(2)

in which R, X, Y and n are as defined in formula (1) are preferred.

Dyes of the formula (1) in which n is the number 0 are also preferred.

Dyes of the formula (1) in which Y is β-chloroethyl are furthermore preferred.

Furthermore, dyes of the formula (1) in which X is chlorine are preferred.

Dyes of the formula

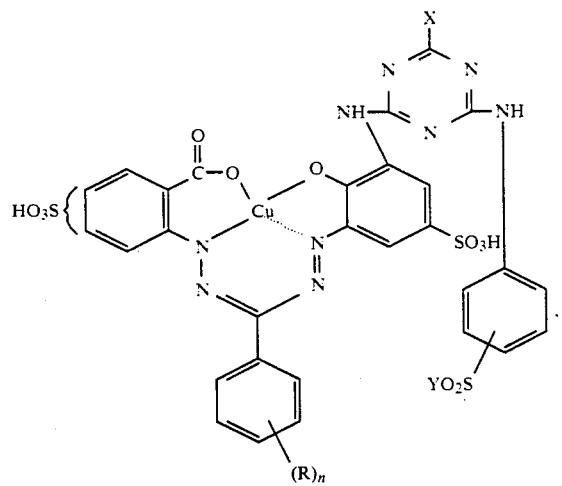

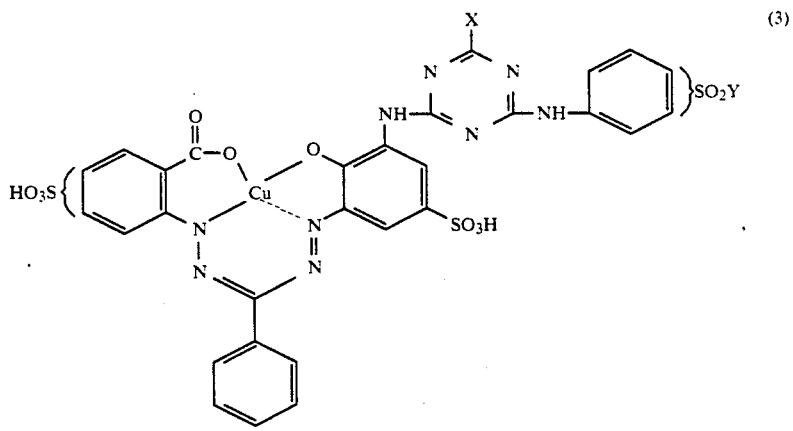

(3)

in which X is fluorine or in particular chlorine and Y is vinyl or in particular β-chloroethyl are particularly preferred.

The invention furthermore relates to a process for the preparation of the dyes of the formula (1), which comprises reacting a compound of the formula

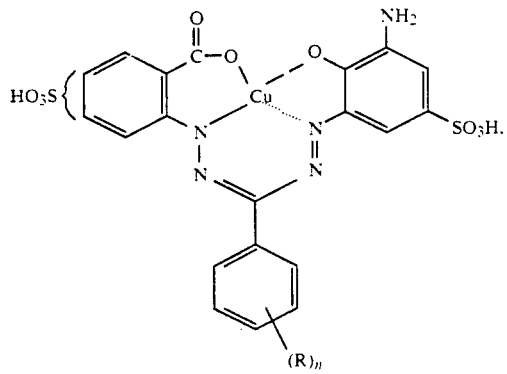

in which R and n are as defined in formula (1) with a compound which introduces the radical of the formula

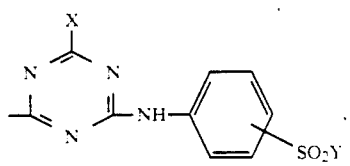

in which X and Y are as defined in formula (1), and, if desired, then converting the radical —SO$_2$Y, if it is β-chloroethylsulfonyl, into vinylsulfonyl, or condensing a compound of the formula (4) first with a compound of the formula

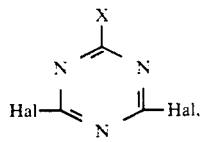

in which X is fluorine or chlorine and Hal is in each case halogen, in particular fluorine or chlorine, and then reacting the condensation product with a compound which introduces the radical of the formula

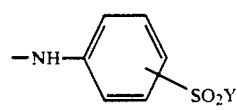

in which Y is as defined in formula (1), and, if desired, converting the radical —SO$_2$Y, if it is β-chloroethylsulfonyl, into vinylsulfonyl.

Suitable compounds which introduce the radical of the formula (5) are preferably the corresponding halides, in particular chlorides or fluorides. Examples are:

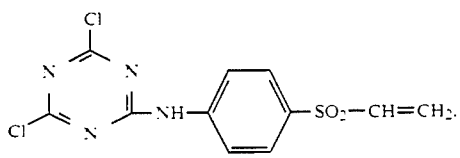

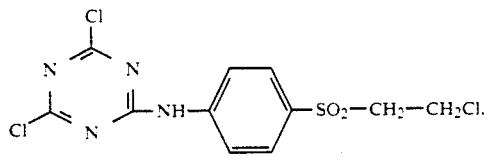

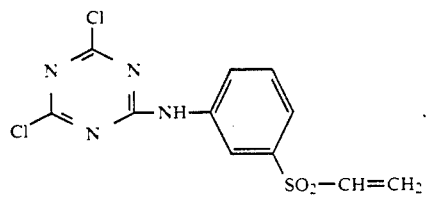

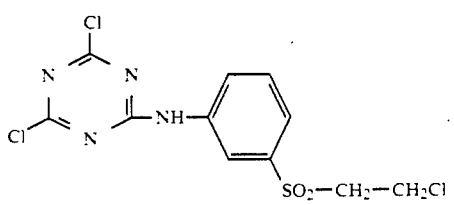

One embodiment of the process according to the invention comprises reacting a compound of the formula (4) with a compound which introduces the radical of the formula

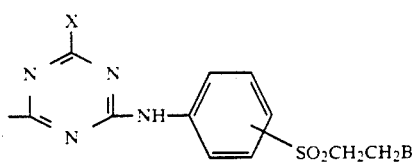

in which X is fluorine or in particular chlorine and B is a radical eliminatable under alkaline conditions, for example —OSO$_3$H, —SSO$_3$H, —OPO$_3$H$_2$, —S—C-S—N(C$_2$H$_5$)$_2$, —N(CH$_3$)$_2$, —N(C$_2$H$_5$)$_2$, —OCOCH$_3$.

The preparation of these dyes containing the radical B is then followed by an elimination reaction. For example, the dye containing the radical B can be subjected to a treatment under alkaline conditions, for example with sodium hydroxide, as a result of which the radical HB is eliminated and the radical of the formula —SO$_2$—(CH$_2$)$_2$—B is converted to the radical —SO$_2$—CH=CH$_2$.

The abovementioned conversion of the β-chloroethylsulfonyl radical into the vinylsulfonyl group proceeds under the same alkaline conditions.

Suitable compounds which introduce the radical of the formula (6) are preferably the corresponding halides, in particular chlorides or fluorides. Examples are:

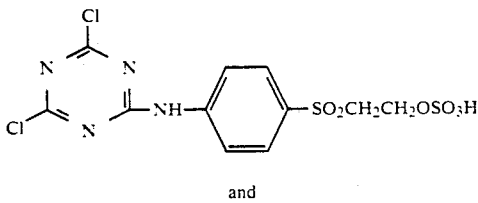

and

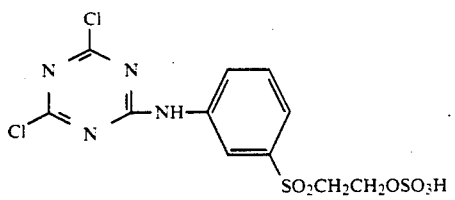

A preferred embodiment of the process according to the invention comprises condensing a compound of the formula (4) first with a compound of the formula

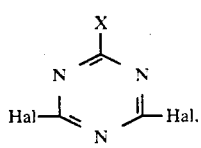 (7)

in which X is fluorine or chlorine and Hal is in each case halogen, in particular fluorine or chlorine and then reacting the condensation product with a compound which introduces the radical of the formula

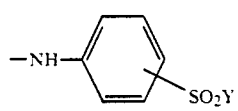 (8)

in which Y is as defined in formula (1), and, if desired, converting the radical —SO$_2$Y, if it is β-chloroethylsulfonyl, into vinylsulfonyl.

Examples of suitable compounds of the formula (7) are cyanuric fluoride and cyanuric chloride. Examples of suitable compounds which introduce the radical of the formula (8) are 3- or 4-(β-chloroethylsulfonyl)aniline and 3- or 4-vinylsulfonylaniline.

A further preferred embodiment of the process according to the invention comprises condensing the compound of the formula (4) first with a compound of the formula (7), then reacting the condensation product with a compound which introduces the radical of the formula

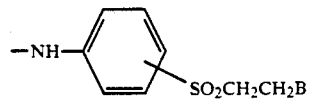 (9)

in which B is as defined in formula (6), and then converting the radical —SO$_2$CH$_2$CH$_2$B into the radical —SO$_2$CH=CH$_2$. Examples of suitable compounds which introduce the radical of the formula (9) are 3- or 4-(β-sulfatoethylsulfonyl)aniline.

The conversion of the radical —SO$_2$CH$_2$CH$_2$Cl or the radical —SO$_2$CH$_2$CH$_2$B into the radical —SO$_2$CH=CH$_2$ proceeds under the abovementioned alkaline conditions.

The reaction of the compound of the formula (4) with the compound introducing the radical of the formula (5) or the radical of the formula (6) or the condensation of the compound of the formula (4) with the compound of the formula (7) and the subsequent reaction of the condensation product with the compound introducing the radical of the formula (8) or the radical of the formula (9) is preferably carried out in aqueous solution, emulsion or suspension, at low temperature, for example 0° to 40° C., and at a weakly acidic, neutral to weakly alkaline pH. Advantageously, the hydrogen halide liberated in the condensation is continually neutralized by adding aqueous alkali metal hydroxides, alkali metal carbonates or alkali metal bicarbonates. Preferably, compounds of the formula (4) in which n is the number 0 are used for the process according to the invention.

In a preferred embodiment of the process according to the invention, a compound of the formula

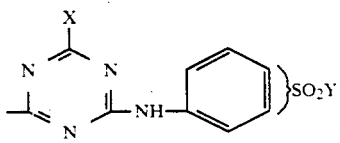 (10)

is used as compound of the formula (5) or a compound of the formula

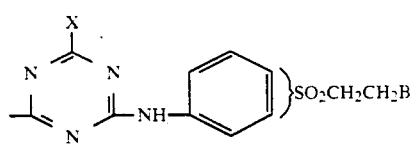 (11)

as compound of the formula (6) or a compound of the formula

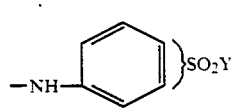 (12)

as compound of the formula (8) of a compound of the formula

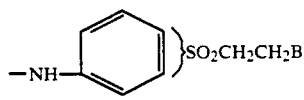 (13)

as compound of the formula (9), in which X and Y are as defined in formula (1) and B is as defined in formula (6).

In a further preferred embodiment of the process according to the invention, a compound introducing the radical of the formula (5) or (6) in which X is chlorine is used.

Preferably, cyanuric chloride is used as compound of the formula (7).

A particularly preferred embodiments of the process according to the invention for the preparation of the dyes of the formula (3) comprises condensing a compound of the formula

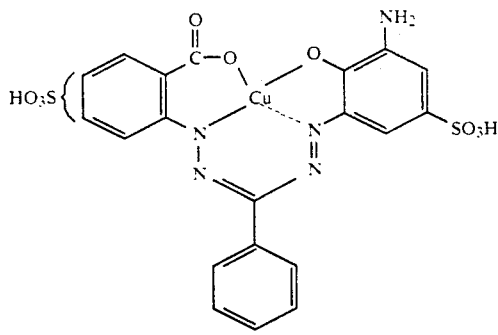

with cyanuric chloride or cyanuric fluoride and then reacting the condensation product with a compound which introduces the radical of the formula (12) in which Y is as defined in formula (3), and, if desired, then converting the radical —$SO_2Y$, if its is $\beta$-chloroethylsulfonyl, into the radical —$SO_2CH=CH_2$, or reacting the condensation product with a compound which introduces the radical of the formula (13), in which B is as defined in formula (6), and then converting the radical —$SO_2CH_2CH_2B$ into the radical —$SO_2CH=CH_2$.

A very particularly important embodiment of the process according to the invention for the preparation of the dyes of the formula (3) comprises reacting a compound of the formula (14) with a compound which introduces the radical of the formula (10), in which X and Y are as defined in formula (3), and, if desired, then converting the radical —$SO_2Y$, if it is $\beta$-chloroethylsulfonyl, into the radical —$SO_2CH=CH_2$, or reacting a compound of the formula (14) with a compound which introduces the radical of the formula (11), in which X is as defined in formula (3) and B as defined in formula (6), and then converting the radical —$SO_2CH_2CH_2B$ into the radical —$SO_2CH=CH_2$.

The compounds of the formula (4) are known per se or can be prepared analogously to known compounds. Regarding the preparation of the copper complexes of the tetradentate formazans, see K. Venkataraman, The Chemistry of Synthetic Dyes, Volume VI, pages 287 to 297, Academic Press New York and London (1972) and Ullmanns Encyklopädie der technischen Chemie (Ullmanns Encylclopaedia of Industrial Chemistry), volume 11, pages 714 to 718, Verlag Chemie (1976).

The compounds which introduce the radical of the formula (5), (6), (8) or (9) and the compounds of the formula (7) are also known per se or can be prepared analogously to known compounds.

The dyes of the formula (1) are suitable for dyeing and printing a wide range of fibre materials, in particular textile fibre materials, preferably hydroxyl- or nitrogen-containing textile materials, for example silk, cellulose fibre materials and in particular wool, synthetic polyamide fibre materials, for example nylon-6 and nylon-6,6 and leather and paper. The dyes of the formula (1) give level dyeings in blue hues which have good general fastness properties, in particular good wet fastness, for examples wet rub fastness and good light fastness. Furthermore, the dyes of the formula (1) show very good properties when combined with other reactive dyes. The abovementioned textile material can be present in a wide range of processing forms, for example as yarn, woven fabric or knitted fabric.

It should be mentioned in particular that the dyes of the formula (1) have high stability to reduction, good exhaustion properties and good fixation speed and high fibre levelness and do not shown dichroism.

The dyes according to the invention of the formula (1) which contain two sulfo groups are present either in the form of their free acid or preferably as their salts. Examples of suitable salts are alkali metal, alkaline earth metal or ammonium salts or the salts of an organic amine. Examples are the sodium salts, lithium salts, potassium salts or ammonium salts or the salt of triethanolamine.

Furthermore, the suitably of the dyes according to the invention of the formula (1) for the trichromic dyeing and printing of natural or synthetic polyamide fibre materials together with a fibre-reactive yellow or orange dye and a fibre-reactive red dye may be mentioned in particular.

Trichromic dyeing is understood to mean the additive colour mixing of suitably chosen yellow or orange, red and blue dyes by means of which virtually any desired hue on the visible colour spectrum can be obtained by a suitable selection of the relative amounts.

The dyes to be used in the trichromic process should have uniform colour build-up in combination with constancy of shade in various concentrations and good combination behaviour.

Accordingly, the invention also relates to a process for the trichromic dyeing or printing of natural and synthetic polyamide fibre materials by means of dye mixtures of fibre-reactive dyes, wherein a blue dye of the formula (1) is used together with a yellow or orange sulfo-containing reactive dye and a red sulfo-containing reactive dye.

In particular, fibre-reactive sulfo-containing yellow or orange and red azo dyes are used which contain as fibre-reactive group preferably a halogenotriazine or halogenopyrimidine group or a group of the aliphatic series.

Preferably, the halogenopyrimidine group or group of the aliphatic series which are used as fibre-reactive group is preferably difluorochloropyrimidinyl, in particular 2,4-difluoro-5-chloropyrimidinyl, or $\alpha,\beta$-dihalogenopropionyl, in particular $\alpha,\beta$-dibromopropionyl, or $\alpha$-halogenoacryloyl, in particular $\alpha$-bromoacryloyl.

Examples of suitable yellow or orange sulfo-containing fibre-reactive dyes are as follows:

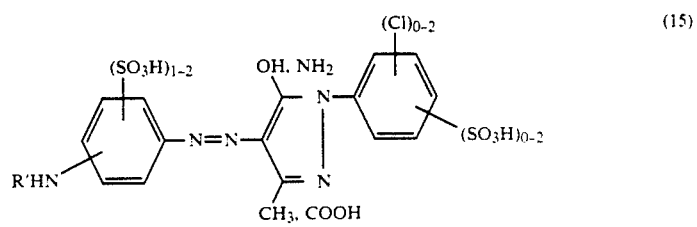

-continued
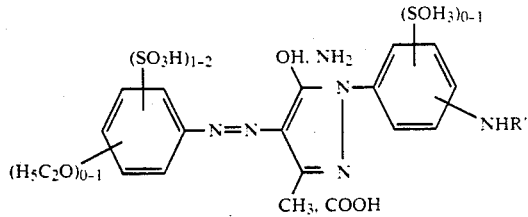 (16)
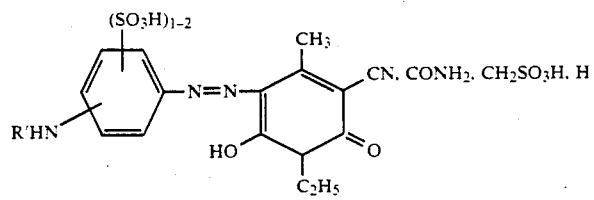 (17)
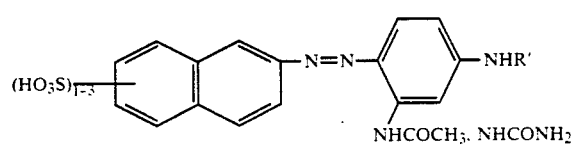 (18)
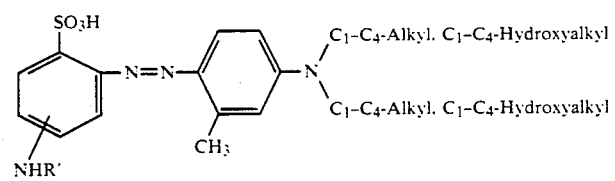 (19)
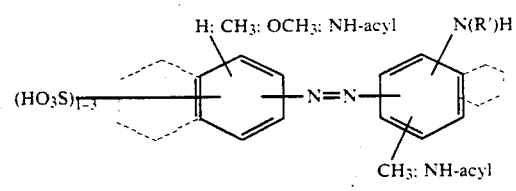 (20)
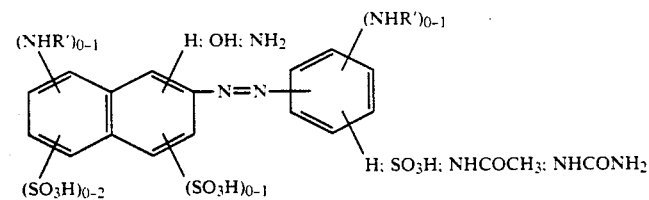 (21)
in which acyl is, for example, acetyl or substituted or unsubstituted benzoyl.
Examples of suitable red sulfo-containing fibre-reactive dyes are as follows:
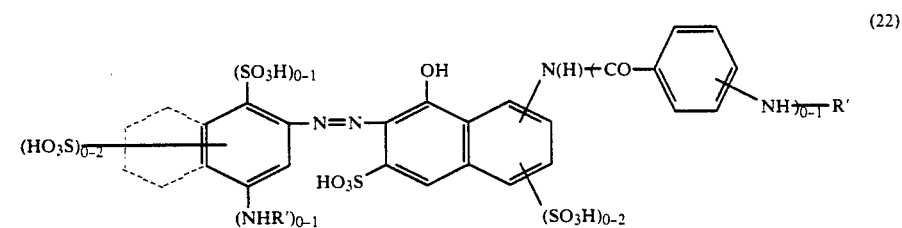 (22)
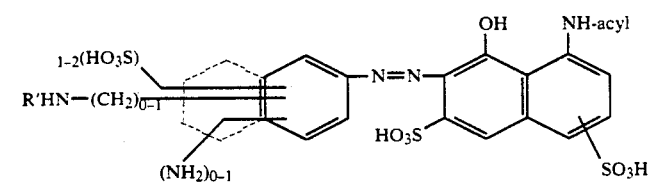 (23)

The fused rings indicated by dots represent naphthalene systems which are possible as an alternative.

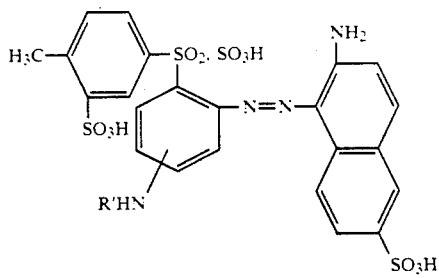
(24)

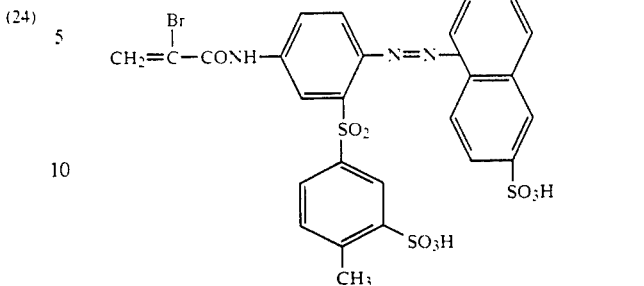
(28)

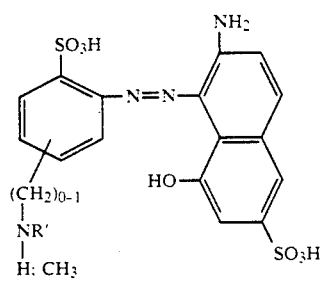
(25)

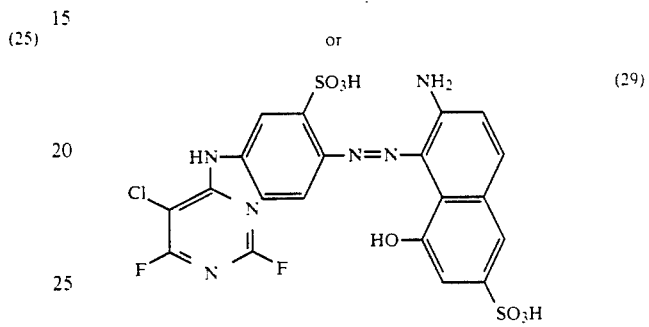
or
(29)

In the formulae above, R' is a fibre-reactive radical, in particular a fibre-reactive radical of the halogenotriazine or the halogenopyrimidine series or of the aliphatic series; preferably, R' is difluorochloropyrimidinyl or α,β-dihalogenopropionyl or α-bromoacryloyl. Particularly preferably, R' is 2,4-difluoro-5-chloropyrimidin-6-yl or α,β-dibromopropionyl or α-bromoacryloyl.

In the process according to the invention for trichromic dyeing or printing of natural and synthetic polyamide fibre materials, the abovementioned dyes, in particular those of the formula (3) and very particularly preferably the dyes of the formula (3) in which X is chlorine and preferably the dyes of the formula (3) in which Y is β-chloroethyl are used as blue dyes.

Particularly preferred yellow or orange dyes are:

The invention also relates to trichromic dye mixtures, which contain a blue dye of the formula (1) together with a yellow or orange sulfo-containing reactive dye and a red sulfo-containing reactive dye, and in which the blue dye of the formula (1), the yellow or orange sulfo-containing reactive dye and the red sulfo-containing reactive dye have the abovementioned meanings and preferences.

The yellow and orange and red dyes used in the process according to the invention for the trichromic dyeing or printing and in the trichromic dye mixtures according to the invention are known or can be prepared analogously to known dyes. The dyes are present either in the form of their free sulfonic acid or preferably as their salt, it being possible to use the same salts mentioned for the dyes of the formula (1).

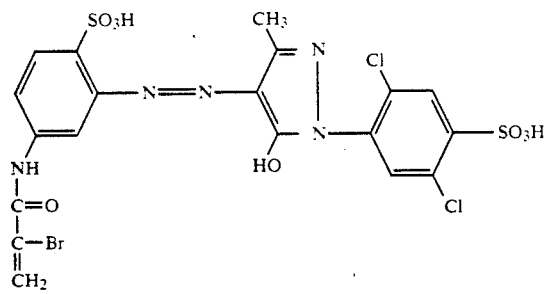
(26)

or

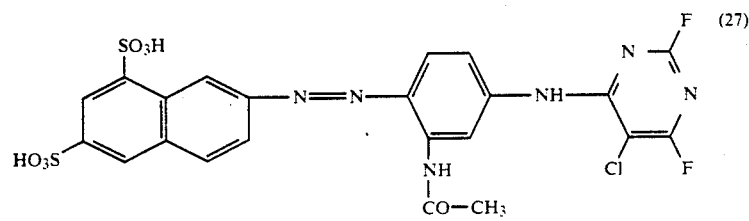
(27)

Particularly preferred red dyes are:

The amounts in which the dyes of the formula (1) and the yellow or orange and red fibre-reactive dyes can be used in the dye baths or printing pastes can vary within wide limits, depending on the desired colour depth: in general, amounts of 0.01 to 10% by weight, in particular 2 to 10 per cent by weight, relative to the material to be dyed or to the printing paste, have proved to be advantageous.

Preferably, natural polyamide fibre material, in particular wool, is used in the process according to the invention.

Special equipment is not required in the process according to the invention. The customary dyeing and printing apparatuses and machines, for example are loose fibres, tops, yarn in hank form, wound packages, piece goods and carpets can be used.

In addition to the reactive dye, the aqueous dye bath can contain dyeing assistants, in particular levelling assistants. The levelling assistants are used in an amount of 0.3 to 3 per cent by weight, relative to the fibre material.

As further dyeing assistants, the dye bath can contain mineral acids, such as sulfuric acid, sulfamic acid or phosphoric acid, organic acids, advantageously lower aliphatic carboxylic acids, such as formic acid, acetic acid or maleic acid. The acids serve in particular to adjust the pH of the liquors used according to the invention.

Preferably, the pH of 3 to 6 is adjusted by means of an orgnaic acid, in particular formic acid or acetic acid.

Preferably, the dyeing is carried out at a pH of 4 to 6, in particular 4.2 to 5.5.

Furthermore, the dye liquor can contain various salts, in particular ammonium salts or alkali metal salts, for example ammonium sulfate or sodium sulfate as dyeing assistants. The liquor ratio can be chosen within a wide range, from 6:1 to 80:1, preferably 10:1 to 50:1.

The dyeing is carried out from aqueous liquor by the exhaust method, for example, at a temperature between 80° and 105° C. or 110° C. if a wool-protecting agent which eliminates formaldehyde is used, preferably 98° and 103° C.

The dyeing time is usually 30 to 90 minutes.

In a particularly preferred embodiment of the process according to the invention, the dye liquor is allowed to cool after the dyeing at preferably 98° to 103° C. to about 75° to 90° C. and the pH is adjusted to 8 to 9, preferably to about 8.5. The pH can be adjusted with conventional agents, for example alkali metal hydroxide solutions and in particular with aqueous ammonia solution of the usual concentration, for example containing 25 per cent by weight of ammonia.

In the examples which follow, parts are by weight. The temperature are degrees centigrade. Parts by weight relate to parts by volume as the gram relates to cubic centimetres.

EXAMPLE 1

13.24 parts of the chromophore of the formula

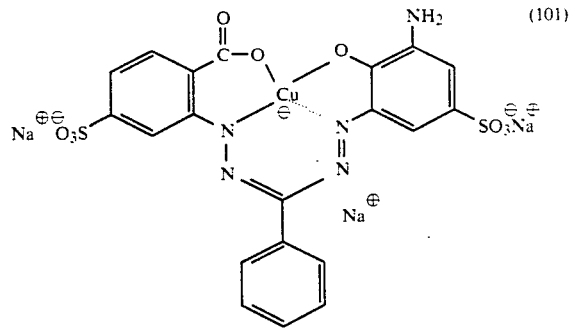

are taken up in 200 parts of water, 0.6 part of disodium hydrogen phosphate is added, and the mixture is warmed to 40°, as a result of which, after the addition of sodium hydroxide solution up to a pH of 6.5, a clear solution of formed. After cooling to 0° to 2°, a solution of 3.9 parts of cyanuric chloride and 25 parts of acetone is added dropwise over a period of 2 to 3 minutes, while maintaining the pH at 6.25 with sodium hydroxide solution.

After the reaction is completed, a solution of 5.27 parts of 4-(2'-chloroethylsulfonyl)aniline in 20 parts of acetone is added dropwise at 0° to 5° over a period of 5 minutes. The pH is kept constant at 6.25 during this addition with sodium hydroxide solution. After stirring overnight, the dye is filtered off with suction, washed with sodium chloride solution and dried at 60° to 70°. This gives 22.4 parts of a dye which has the formula (102).

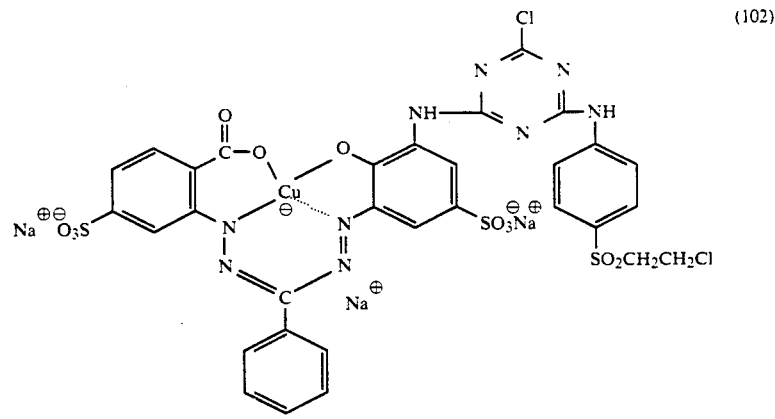

The dye of the formula (102) dyes wool in blue hues which have good fastness properties.

EXAMPLE 2

3 parts of the dye of the formula (102) from Example 1 are dissolved at 0° to 5° in 50 parts of water. The solution is brought to a pH of 12 with sodium hydroxide solution and stirred at room temperature for 3 hours.

The pH is lowered to 7, and, after adding sodium chloride, the dye is filtered off with suction, washed with sodium chloride solution and dried at 60° to 70°. This gives 3.3 parts of a dye which has the formula (103).

The dye of the formula (104) dyes wool in blue hues which have good fastness properties.

EXAMPLE 4

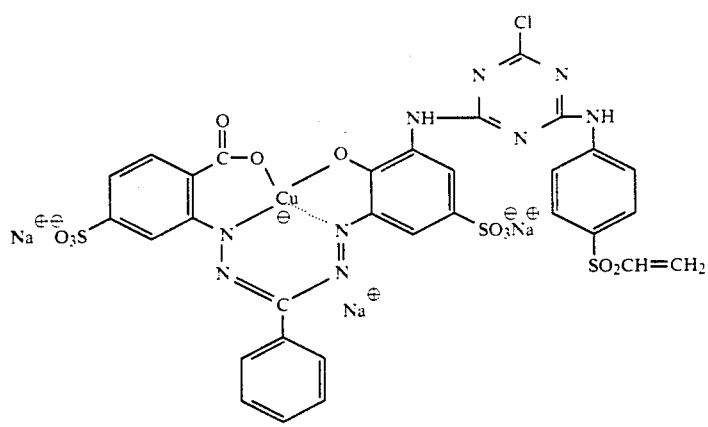
(103)

The dye of the formula (103) dyes wool in blue hues which have good fastness properties.

EXAMPLE 3

The procedure of Example 1 is repeated, except that an equimolar amount of 3-(2'-chloroethylsulfonyl)aniline is used instead of 5.27 parts of 4-(2'-chloroethylsulfonyl)aniline, to give 22.6 parts of a dye which has the formula (104).

The procedure of Example 2 is repeated, except that an equimolar amount of a dye of the formula (104) from Example 3 is used instead 3 parts of the dye of the formula (102), to give 3.2 parts of a dye which has the formula (105).

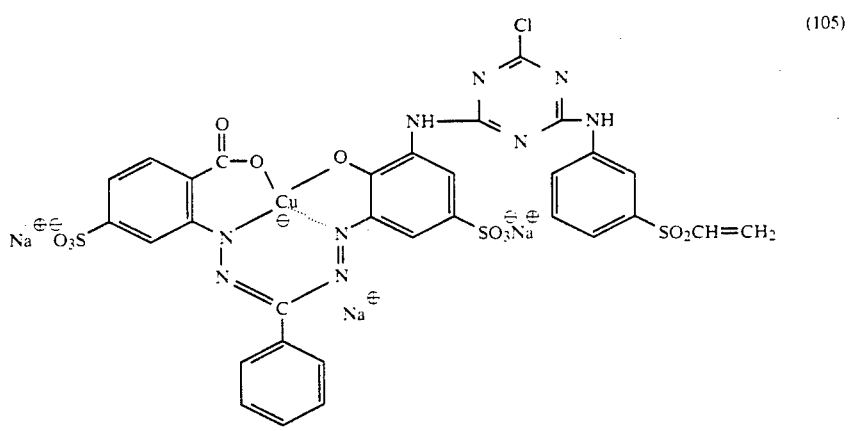
(105)

The dye of the formula (105) dye wool in blue hues which have good fastness properties.

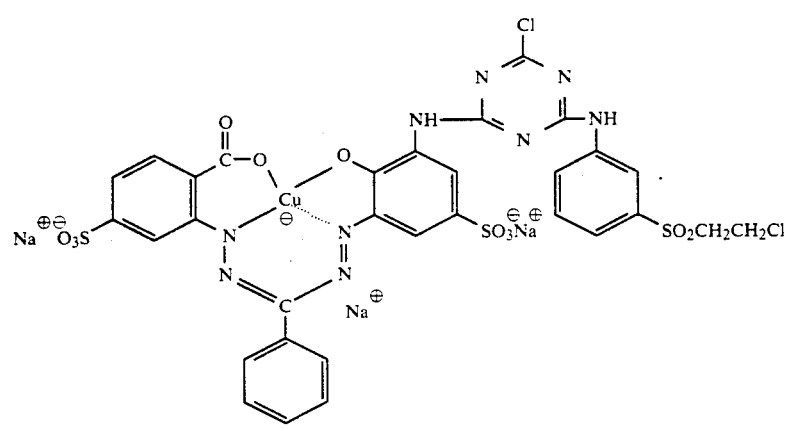
(104)

EXAMPLE 5

The procedure of Example 1 is repeated, except that an equimolar amount of chromophore of the formula Example 5 instead of 13.24 parts of the chromophore of the formula (101) and 6.6 parts of 3-(2'-chloroethylsulfonyl)aniline instead of 5.27 parts of 4-(2'-chloroethylsulfonyl)aniline are used, to give 27.8 parts of a dye which has the formula (108).

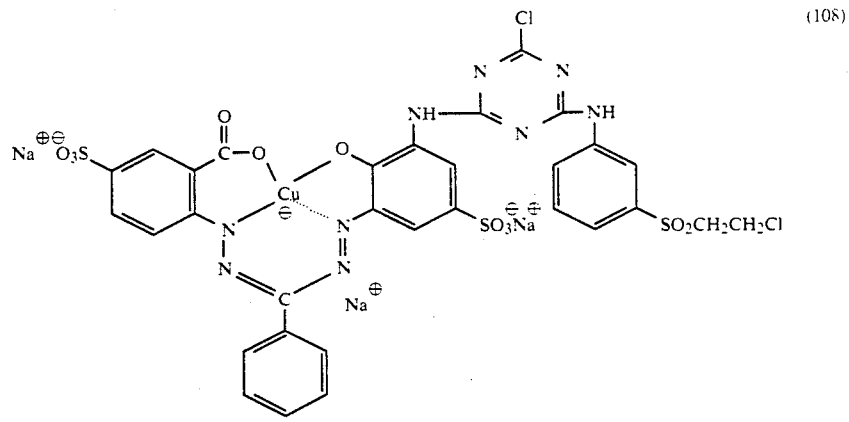
(108)

The dye of the formula (108) dyes are wool in blue hues which have good fastness properties.

EXAMPLE 7

2.2 parts of 4-(2'-chloroethylsulfonyl)aniline are dissolved in a mixture of 25 parts of acetone and 25 parts of water. After cooling to 0° to 2°, 1.49 parts of cyanuric fluoride are added dropwise over a period of 1 to 2 minutes, while the pH is maintained at 6 to 6.5 by adding sodium hydroxide solution. After the condensation is completed, a solution of 5.96 parts of the chromophore of the formula (106) in 50 parts of water is added dropwise at 5° over a period of 10 minutes, while the pH is maintained at 6.25 with sodium hydroxide solution. After stirring at room temperature and adding sodium chloride, the dye is filtered off with suction, washed with sodium chloride solution and dried at 60° to 70°. This gives 5.0 parts of a dye which has the formula (109).

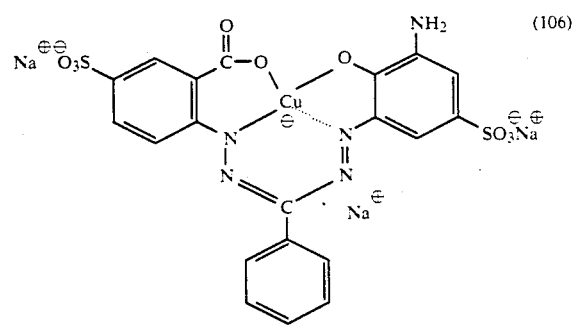
(106)

is used instead of 13.24 parts of the chromophore of the formula (101), to give 21.4 parts of a dye which has the formula (107).

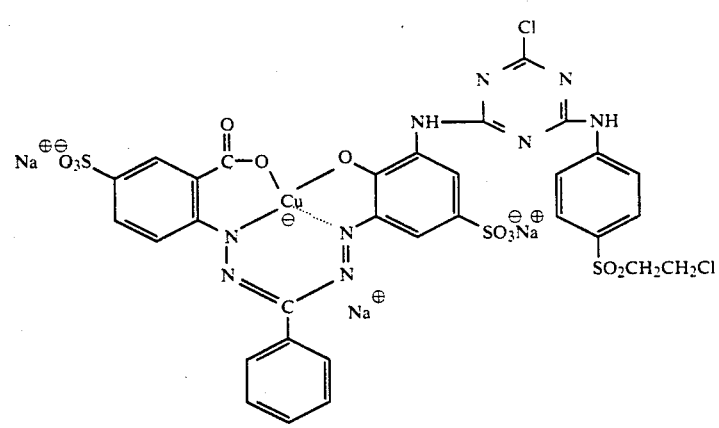
(107)

The dye of the formula (107) dyes wool in blue hues have good fastness properties.

EXAMPLE 6

The procedure of Example 1 is repeated, except that 16.6 parts of the chromophore of the formula (106) from

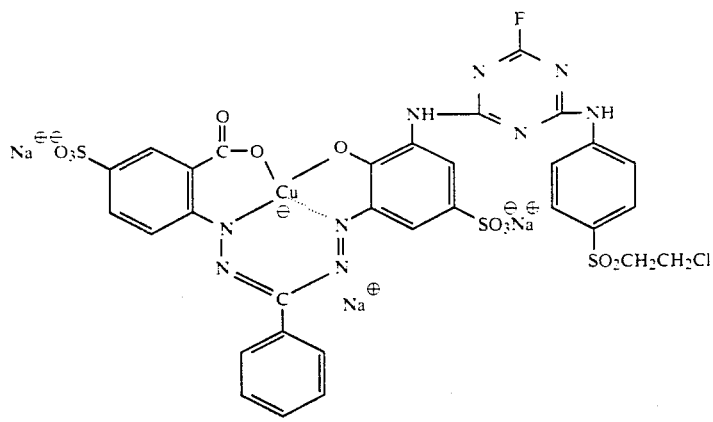

(109)

The dye of the formula (109) dyes wool in blue hues which have good fastness properties.

EXAMPLE 8

The procedure of Example 7 is repeated, except that 6.6 parts of 3-(2'-chloroethylsulfonyl)aniline, dissolved in 25 parts of acetone, instead of 2.2 parts of 4-(2'-chloroethylsulfonyl)aniline, dissolved in 25 parts of water and 25 parts of acetone, and 16.6 parts of the chromophore of the formula (106) are used instead of 5.96 parts of this chromophore, to give 22.9 parts of a dye which has the formula (110).

pH of 6.5. After cooling to 0° to 2°, 1.49 parts of cyanuric fluoride are added dropwise for a period of 1 to 2 minutes, while the pH is maintained at 6 to 6.5 by adding sodium hydroxide solution. After the condensation is completed, a solution of 5.96 parts of the chromophore of the formula (106) in 50 parts of water is added dropwise at 5° over a period of 10 minutes, while the pH is maintained at 6.25 with sodium hydroxide solution. After stirring at room temperature and adding sodium chloride, the composed obtained is filtered off with suction, washed with sodium chloride solution and dried at 60° to 70°. 5 parts of the compound thus ob-

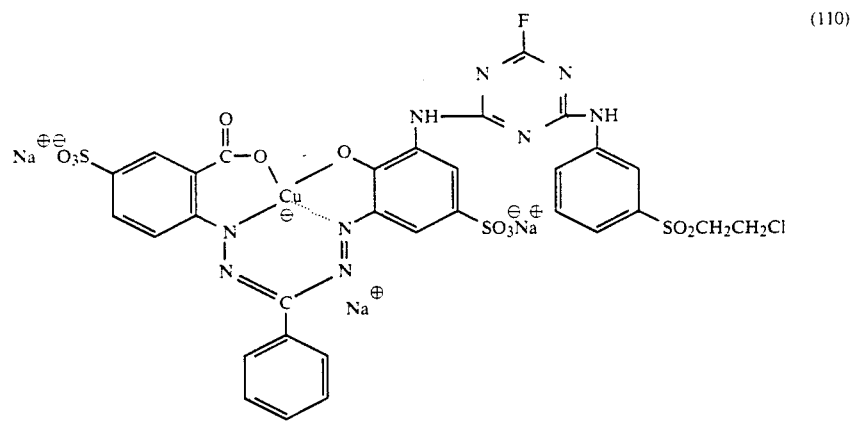

(110)

The dye of the formula (110) dyes wool in blue hues which have good fastness properties.

EXAMPLE 9

2.81 parts of 4-(2'-sulfatoethylsulfonyl)aniline are taken up in 42 parts of water and dissolved at room temperature by means of sodium hydroxide solution at a tained are dissolved in 50 parts of water, brought to a pH of 10 with sodium hydroxide solution and stirred at room temperature for 20 hours. The pH is then brought to 7 with hydrochloric acid, and the dye obtained is filtered off with suction. Washing with sodium chloride solution and drying at 60° to 70° gives 3.3 parts of a dye which has the formula (111).

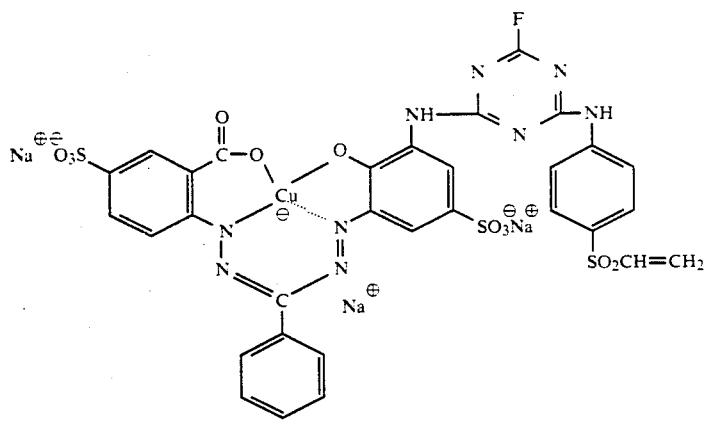

(111)

The dye of the formula (111) dyes wool in blue hues which have good fastness properties.

Dyeing Example 1

4 parts of 80% acetic acid, 2 parts of the ammonium salt of the monosulfate of the adduct of a fatty amine (consisting of 30% of hexadecylamine, 25% of octadecylamine and 45% of octadecenylamine and 7 mol of ethylene oxide) and 4 parts of ammonium sulfate are dissolved in succession in 4000 parts of water at 50°.

4 parts of the dye obtained according to Example 1 are dissolved in 100 parts of hot water and added to the above dyebath. 100 parts of prewetted tops of a wool knitting yarn are then placed into the dyebath, and the temperature of the bath is increased from 50° to 80° over a period of 30 minutes. After dying at 80° for 20 minutes, the bath is heated to boiling and the dyeing is then continued for 90 minutes at the boiling temperature. The dye shows almost complete exhaustion onto the substrate. After the bath has been cooled to 80°, the pH of about 4.5 is raised to a permanent value of 8.5 by adding ammonia solution, and the dyed material is aftertreated at this temperature for 20 minutes. After thorough rinsing with hot and cold water, acidification with 1 part of 80% formic acid, centrifugation and drying, a dark blue coloured wool yarn of very good and rub fastness and excellent light fastness is obtained.

Dyeing Example 2

A wool fabric which has been given an anti-felting finish is impregnated with a preparation described below and squeezed off on a pad-mangle to a liquor pickup of 250%.

```
  4 parts of Diaprint REG ® (acid-resistant thickener).
  1 part of sulfamic acid
0.2 part of thymol
0.2 part of emulsifier
94.6 parts of water
100 parts
```

The impregnated material is then pressed in a heatable press at 100° to 105° for 3 minutes under a pressure of about 0.5 kg/cm² together with a transfer paper which carries a printing pattern applied in the usual manner by means of the dye according to Example 3. After rinsing and drying, the wool fabric has the corresponding blue printing pattern which has very good fastness properties.

Dyeing Example 3

A flannel fabric consisting of chlorinated wool is impregnated on a pad-mangle with the dye preparation described below and squeezed off to a liquor pickup of 100%.

```
  50 parts of the dye according to Example 4
 300 parts of urea
 320 parts of Solvitose OFA ® at 40% (thickener)
  10 parts of a mixture of anion-active fatty alcohol ether sulfate
       with non-ionic wetting agents
  10 parts of the levelling agent used in Dyeing Example 1
  10 parts of sodium metabisulfite
  10 parts of 80% acetic acid
 290 parts of water
1000 parts of padding liquor
```

The impregnated fabric is then stored at room temperature for 48 hours while rolled-up and wrapped air-tight. After rinsing with cold water, the material is treated in a fresh bath with such an amount of 24% ammonia that a pH of 8.5 is obtained and maintained at 80° for 15 minutes. After rinsing in warm water, it is finally acidified with 80% acetic acid and dried. The wool fabric has been dyed in a full blue shade which has excellent fastness properties.

Dyeing Example 4

A flannel fabric consisting of chlorinated wool is impregnated on pad-mangle with the dye preparation described below and squeezed off to a liquor pickup of 100%.

```
  50 parts of the dye according to Example 5
 300 parts of Solvitose OFA ® at 40% (thickener)
  20 parts of a mixture of anion-active fatty alcohol ether sulfate
       with non-ionic wetting agents
  10 parts of the levelling agent used in Dyeing Example 1
  20 parts of 80% acetic acid
 600 parts of water
1000 parts of padding liquor
```

The impregnated fabric is then taken to a steaming cabinet and treated with saturated steam for 20 to 40 minutes. After rinsing with cold water, the material is treated in a fresh bath with such an amount of 24% ammonia that a pH of 8.5 is obtained and maintained at 80° for 15 minutes. After rinsing in warm water, it is finally acidified with 80% acetic acid and dried. The wool fabric has been dyed in a full blue shade which has excellent fastness properties.

Dyeing Example 5

4 parts of 80% acetic acid, 2 parts of the ammonium salt of the monosulfate of the adduct of a fatty amine (consisting of 30% of hexadecylamine, 25% of octadecylamine and 45% of octadecenylamine and 7 mol of ethylene oxide) and 4 parts of ammonium sulfate are dissolved in succession in 1000 parts of water at 50°.

3 parts of the dye obtained according to Example 1 are dissolved in 100 parts of hot water and added to the above dyebath. A circulation dyeing apparatus is charged with 100 parts of prewetted tops in the form of wound packages, and the temperature of the bath is increased from 50° to 97°-99° over a period of 30 minutes, and the material is then dyed for 90 minutes at the boiling temperature. The dye shows almost complete exhaustion onto the substrate. After the bath has been cooled to 80°, the pH of about 4.5 is raised to a permanent value of 8.5 by adding ammonia solution, and the dyed material is aftertreated at this temperature for 20 minutes. After thorough rinsing with hot and cold water, acidification with 1 part of 80% formic acid, centrifugation and drying, a dark blue coloured material of very good wet fastness and excellent light fastness is obtained.

Dyeing Example 6

6 parts of 80% acetic acid, 3 parts of the ammonium salt of the monosulfate of the adduct of a fatty amine (consisting of 30% of hexadecylamine, 25% of octadecylamine and 45% of octadecenylamine and 7 mol of ethylene oxide) and 6 parts of ammonium sulfate are dissolved in succession in 1000 parts of water at 50°.

3 parts of the dye obtained according to Example 7 are dissolved in 100 parts of hot water and added to the above dyebath. A circulation dyeing apparatus is charged with 150 parts of prewetted loose wool, and the temperature of the liquor is increased from 50° to 97°-99° over a period of 30 minutes, and the material is then dyed for 90 minutes at the boiling temperature. The dye shows almost complete exhaustion onto the substrate. After the bath has been cooled to 80°, the pH of about 4.5 is raised to a permanent value of 8.5 by adding ammonia solution, and the dyed material is aftertreated at this temperature for 20 minutes. After thorough rinsing with hot and cold water, acidification with 1 part of 80% formic acid, centrifugation and drying, a substrate dyed in a blue level shade of very good wet and rub fastness and excellent light fastness is obtained.

Dyeing Example 7

4 parts of 80% acetic acid, 2 parts of the ammonium salt of the monosulfate of the adduct of a fatty amine (consisting of 30% of hexadecylamine, 25% of octadecylamine and 45% of octadecenylamine and 7 mol of ethylene oxide) and 4 parts of ammonium sulfate are dissolved in succession in 4000 parts of water at 50° C.

0.45 part of the dye obtained according to Example 1 and 0.30 part of the yellow dye of the formula

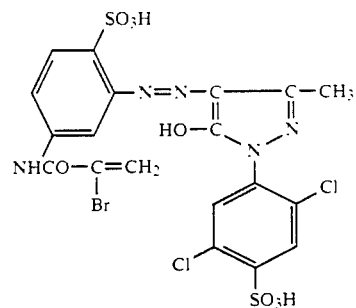

and 0.40 part of the red dye of the formula

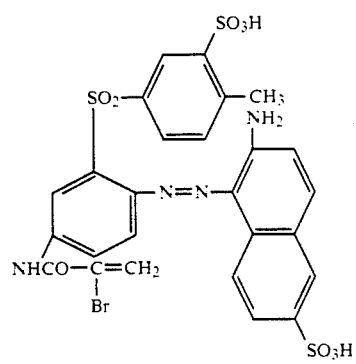

are dissolved in 100 parts of hot water and added to the above dyebath, 100 parts of a prewetted wool fabric are then placed into the dyebath, and the temperature of the bath is increased from 50° to 80° over a period of 30 minutes. After dyeing at 80° for 20 minutes, the bath is heated to boiling and the dyeing is then continued for 90 minutes at the boiling temperature. The dye shows almost complete exhaustion onto the substrate. After the bath has been cooled to 80°, the pH of about 4.5 is raised to a permanent value of 8.5 by adding ammonia solution, and the dyed material is aftertreated at this temperature for 20 minutes. After thorough rinsing with hot and cold water, acidification with 1 part of 80% formic acid, centrifugation and drying, a wool fabric dyed in a level dark brown shade of very good wet and rub fastness and excellent light fastness is obtained.

Dyeing Example 8

4 parts of 80% acetic acid, 2 parts of ammonium salt of the monosulfate of the adduct of a fatty amine (consisting of 30% of hexadecylamine, 25% of octadecylamine and 45% of octadecenylamine and 7 mol of ethylene oxide) and 4 parts of ammonium sulfate are dissolved in succession in 4000 parts of water at 50°.

0.6 part of the dye obtained according to Example 3 and 0.09 part of the yellow dye of the formula

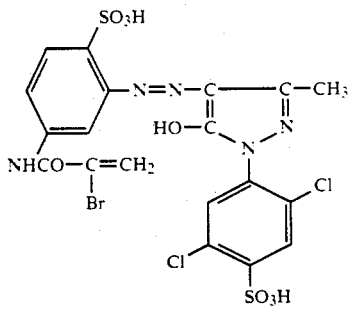
(112)

and 0.2 part of the red dye of the formula

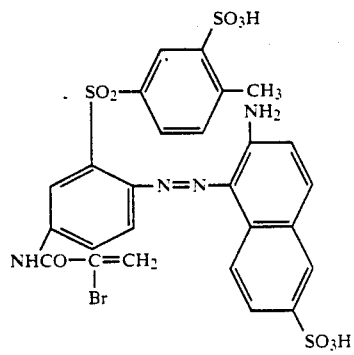
(113)

are dissolved in 100 parts of hot water and added to the above dyebath. A circulation dyeing apparatus is charged with 100 parts of prewetted tops in the form of wound packages, and the temperature of the bath is increased from 50° to 97°–99° over a period of 30 minutes, and the material is then dyed for 90 minutes at the boiling temperature. The dye shows almost complete exhaustion onto the substrate. After the bath has been cooled to 80°, the pH of about 4.5 is raised to a permanent value of 8.5 by adding ammonia solution, and the dyed material is aftertreated at this temperature for 20 minutes. After thorough rinsing with hot and cold water, acidification with 1 part of 80% formic acid, centrifugation and drying, a grey coloured material of very good wet and rub fastness and excellent light fastness is obtained.

What is claimed is:

1. A fibre-reactive formazan dye of the formula

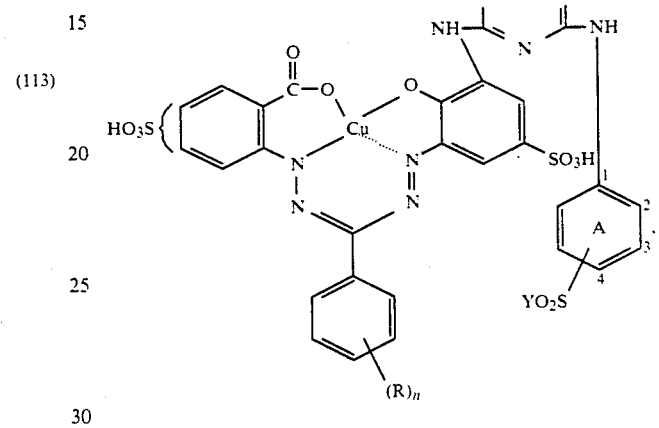

in which X is fluorine or chlorine, and in which a radical $-SO_2Y$ is bonded to the phenyl ring A in 3- or 4-position and Y is $\beta$-chloroethyl.

2. A fibre-reactive formazan dye according to claim 1, wherein the radical $-SO_2Y$ is bonded to the phenyl ring A in 4-position.

3. A fibre-reactive formazan dye according to claim 1, in which X is chlorine.

* * * * *